United States Patent [19]
Leisterer et al.

[11] 3,935,575
[45] Jan. 27, 1976

[54] CIRCUITRY FOR DETERMINING DIRECTION OF IMPINGEMENT OF A RECEIVED SIGNAL

[75] Inventors: Reinhard Leisterer, Bremen; Walter Mahlstedt, Moordeich; Manfred Rübel, Bremen, all of Germany

[73] Assignee: Fried. Krupp Gesellschaft mit beschrankter Haftung, Essen, Germany

[22] Filed: Nov. 28, 1972

[21] Appl. No.: 310,074

[30] Foreign Application Priority Data
Dec. 3, 1971  Germany............................ 2159977

[52] U.S. Cl.............................. 343/113 R; 343/114
[51] Int. Cl.² .......................................... G01S 5/02
[58] Field of Search ...................... 343/113 R, 114

[56] References Cited
UNITED STATES PATENTS
| | | | |
|---|---|---|---|
| 3,121,228 | 2/1964 | Kalmus ........................... | 343/113 R |
| 3,121,871 | 2/1964 | Beukers .......................... | 343/113 R |
| 3,392,392 | 7/1968 | Magnuski ......................... | 343/113 R |
| 3,462,729 | 8/1969 | Papineau et al. ................ | 343/113 R |

FOREIGN PATENTS OR APPLICATIONS
| | | | |
|---|---|---|---|
| 1,061,395 | 7/1959 | Germany......................... | 343/113 R |
| 175,891 | 7/1961 | Sweden........................... | 343/113 R |
| 1,251,827 | 10/1967 | Germany......................... | 343/113 R |

*Primary Examiner*—Richard A. Farley
*Assistant Examiner*—S. C. Buczinski
*Attorney, Agent, or Firm*—Spencer & Kaye

[57] ABSTRACT

An improved system for determining the direction of impingement of a received energy signal, of the type having a plurality of receivers forming pairs of mutually perpendicular dipoles for receiving the orthogonal components of the impinging signal, apparatus for measuring these received components in order to produce signals indicative of the direction of impingement, and a display device connected to the output of the measuring apparatus. The measuring apparatus is provided with a plurality of amplifier circuits each of which is connected to a respective one of the receivers for producing a constant amplitude representation of its received signal. The use of these amplifiers helps to eliminate errors that would otherwise occur in the measurements due to inaccuracies in the measured amplitudes of the received dipole signals.

14 Claims, 18 Drawing Figures

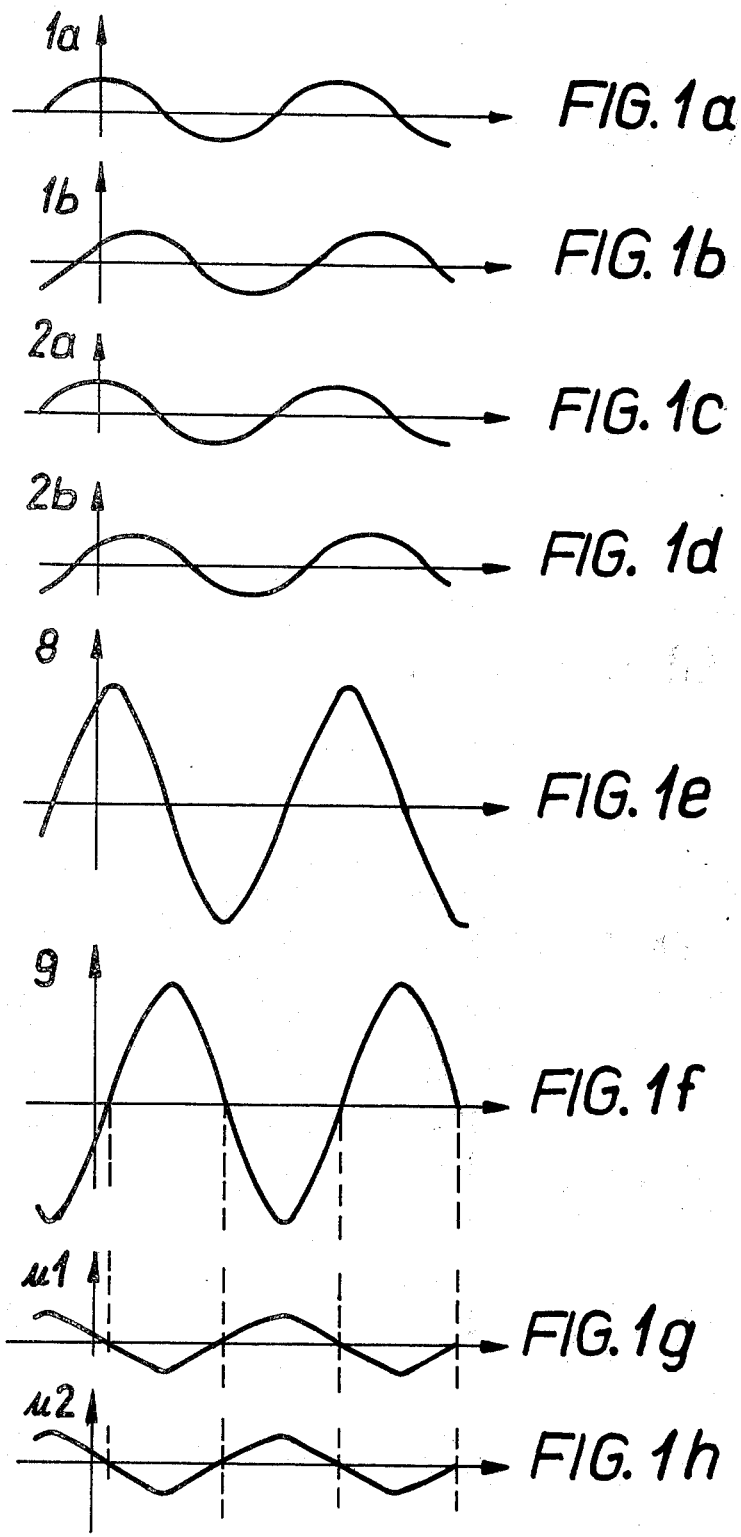

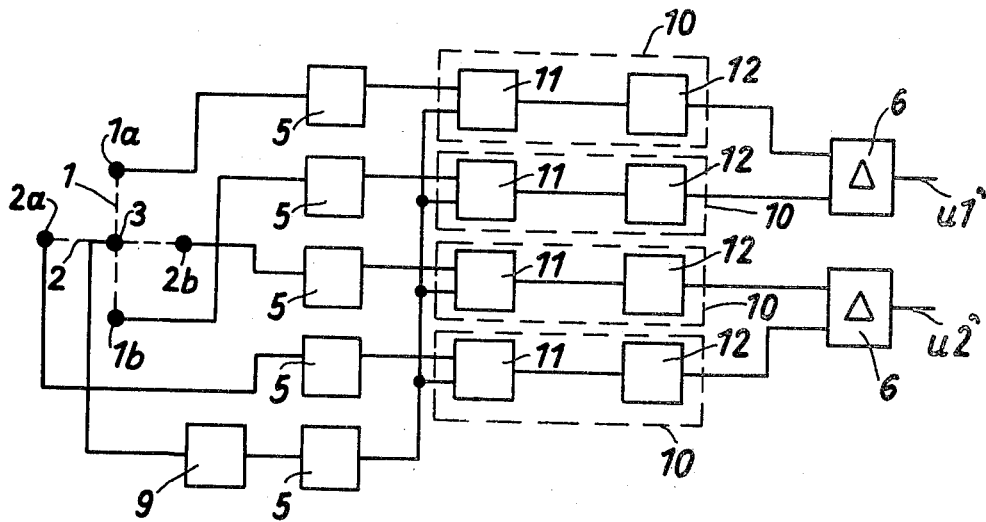
Fig. 3
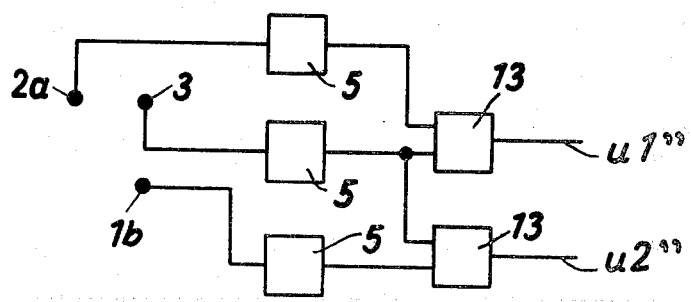
Fig. 4
PHASE DISCRIMINATOR
Fig. 5

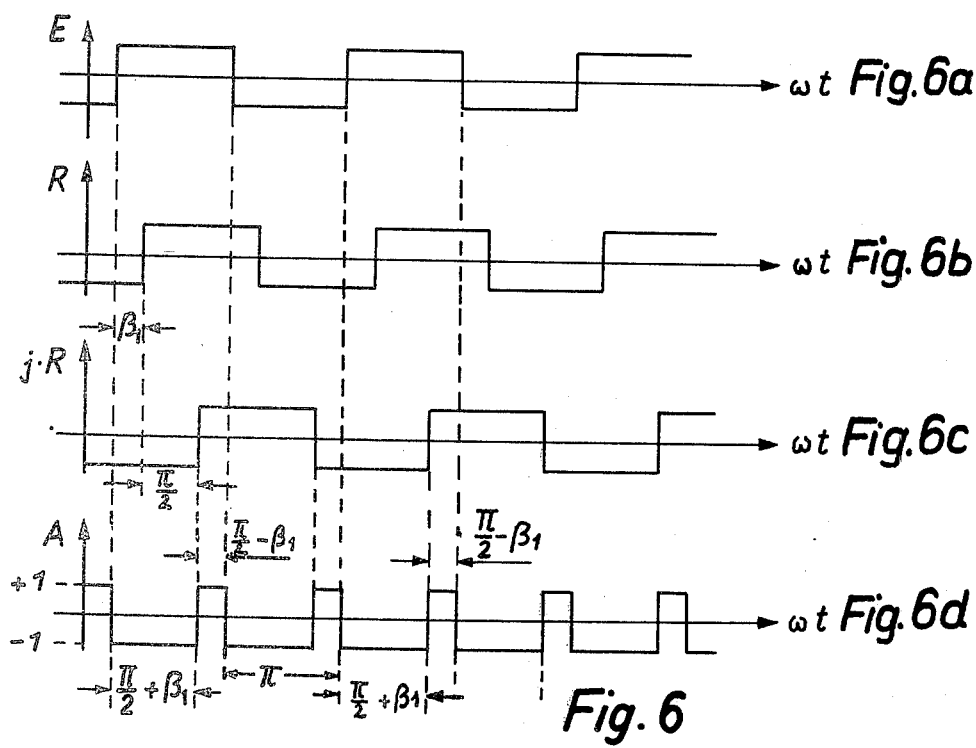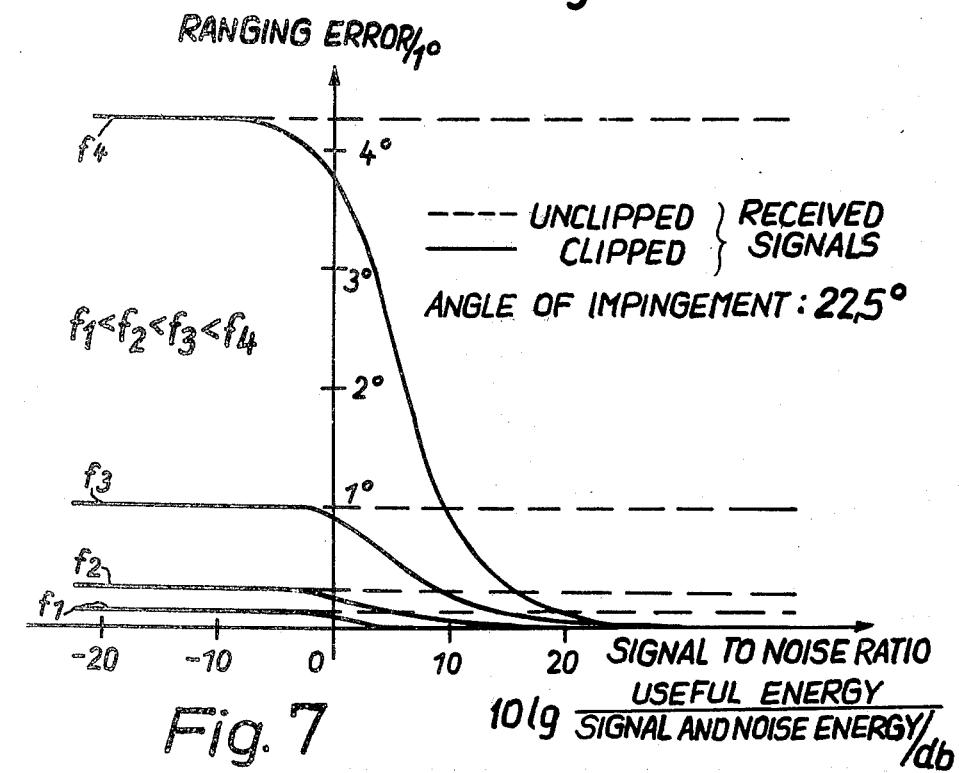

CIRCUITRY FOR DETERMINING DIRECTION OF IMPINGEMENT OF A RECEIVED SIGNAL

BACKGROUND OF THE INVENTION

The invention relates to circuit arrangements for the determination of the direction of received wave energy, particularly sound waves, with the use of a ranging system having two perpendicularly arranged pairs of dipoles including individual receivers, and a measuring device with a bearing display device for displaying the direction of impingement of the received wave energy in the plane of the ranging system.

Ranging systems of the above type are known and are usually used as gradient ranging systems. In such systems, each pair of dipoles includes two oppositely disposed individual receivers or a hollow cylindrical receiving element of piezo-ceramic or magnetostrictive metal. These receivers are connected with circuitry for measuring the direction of impingement of the received energy wave which direction is then connected to a display device.

Systems for evaluating and producing a display of the direction of impingement of received energy waves are known. The circuitry of the known systems produces this display by forming the simple difference of the received signals of the individual receivers of each pair of dipoles, and the sum of the received signals of all of the individual receivers. The two signals representing differences are fed to the deflection system of the display device and the signal representing the summation is first phase shifted and then applied to the brightness control of the display device. A system operating in this manner is shown in the U.S. Pat. No. 3,496,527. The display device generally utilized for such purposes is a cathode-ray tube.

Instead of utilizing the summation signal, it is also possible to use the received signal of an additional panoramic or omnidirectional receiver which is arranged in the center of the four individual receivers corresponding to the two pairs of dipoles. In either case, the direction of impingement of the received wave energy is displayed in the form of a radial luminous streak whose position with respect to a reference direction indicates the direction of impingement.

It is also known that by means of a correlation process between the differences derived from the received signals from the individual receivers of a pair of dipoles and the received signal from the panoramic or omnidirectional receiver whose output is independent of the direction of impingment, a display of the direction of impingement can be developed in the form of a luminous dot or streak on the screen of a cathode-ray tube. The distance of the luminous dot from the center of the screen or the length of the luminous streak can be variably controlled by an adjustable amplification of the signal representing the difference between the received signals (see U.S. Pat. No. 3,496,527).

In gradient ranging systems in which the received signals are used for the indication of the direction of impingement as differences which are evaluated either directly or correlatively, systematic ranging errors which occur due to higher harmonics of the angle of impingement of the wave energy with respect to a reference direction, falsify the derived indication.

Solutions which are known for suppressing these systematic ranging errors involve the use of additional gradient systems in suitable arrangement with the original gradient ranging system (see U.S. Pat. No. 3,588,797 and U.S. Pat. No. 3,496,527). While theoretically such a solution should present a display with few errors for the desired direction of impingement, in practice the technical realization is both complicated and expensive. Additionally, due to the considerable increase in necessary equipment for the additional gradient system, there results an increase in the possibilities for error in the total operation of the system. Such a system would moreover be larger and also would have a higher weight.

SUMMARY OF THE INVENTION

An object of the present invention is to provide a circuit arrangement for determining the direction of impingement of a received energy wave in which the direction can be accurately determined by means of a ranging system of the above-mentioned type and without the use of additional ranging systems.

A further object of the present invention is to provide a circuit arrangement for determining the direction of impingement of received energy without any significant errors due to higher harmonics of the angle of impingement of the received wave or due to the manufacturing tolerances of the individual receivers.

A system according to the invention can be utilized for both gradient evaluation and phase evaluation.

In designing a system for accomplishing these objectives, an initial consideration is that due to manufacturing tolerances in the individual receivers the sensitivity of each receiver is different from the others. Thus the amplitudes of simultaneously received signals, once they have been converted into electrical values, are unfortunately never exactly the same. Such errors in the amplitude of the signals lead to errors in the difference formation of the received signals from the dipoles. In prior devices utilizing gradient evaluation, these errors in the signal from the differences formation are incorporated in the determination of the direction.

This problem is solved according to the present invention in that each of the individual receivers forming the pairs of dipoles is connected to a respective amplifier circuit for producing a constant amplitude output for the received signal prior to the signal being evaluated in a known manner in the measuring device.

Automatic gain control amplifiers (AGC-amplifers), which are well known circuits, can be employed for the purpose of producing the desired constant amplitude output. These automatic gain control amplifiers will hereafter be referred to as control amplifiers. Since control amplifiers are known to be able to control the amplitude only after a certain period of time, their use is especially advantageous for stationary received signals. More generally useful for producing the desired output are the known symmetrical limiters, for example Schmitt triggers or nonlinearly feedback connected amplifiers, which infinitely clip the signals received from the individual receivers. Such limiters or clippers are well known in the art.

The use of symmetrical limiters provides a possibility of also being able to display the direction of a pulse-shaped signal, which is characterized by a short duration and a very high amplitude, without the necessity of providing for special dynamic matching with the indicator device. When low amplitude signals are received, which may have only unambiguous phase information, the amplifying characteristics of the symmetrical limiters enable a determination of the direction of the signals with the same precision.

The direction of impingement of the received wave energy can then be obtained utilizing only the phase information of the received signals of the individual receivers, and thus independent of any amplitude errors which might occur. The infinite clipping of the symmetrical limiters is especially advantageous in eliminating the effect of interfering ranging errors which are due to the higher spatial harmonics of the angle of impingement since it eliminates the need of analyzing any sinusoidal received signals. Furthermore, due to the advantages of this circuitry the ranging system can be constructed in its simplest form of two perpendicularly disposed pairs of dipoles, i.e. modified systems are not required which due to the tolerances to be maintained are difficult to fabricate and are heavier, bulkier and more expensive. Since further processing of the respectively received amplitude of each pair of receivers is always carried out with the signal having a constant value, the system has the advantage that signals received over a very large dynamic range can be processed. With correlative processing, accurate synchronization of the amplitudes of the received signals is assured since they are now constant. The received signals, represented by constant amplitudes in accordance with the invention, are now connected with the known circuits for gradient evaluation, i.e. a sum-difference circuit with or without correlation evaluation, or known circuits for phase evaluation.

BRIEF DESCRIPTION OF THE DRAWINGS

FIGS. 1a–1h show the time sequences of received signals in accordance with the circuit of FIG. 1.

FIG. 3 is a block diagram showing a variation of the system according to FIG. 2.

FIG. 4 is a block diagram of a system for phase measuring without gradient formation in accordance with the present invention.

FIG. 5 is a block diagram of another phase measurement in accordance with the invention.

FIG. 6a–d show the time sequences of received signals in accordance with the circuit of FIG. 3.

FIG. 7 is a diagram of systematic bearing errors versus signal to noise ratio during the processing of clipped received signals and unclipped received signals with constant amplitude.

DETAILED DESCRIPTION OF THE PREFERRED EMBODIMENTS

Figure 1:
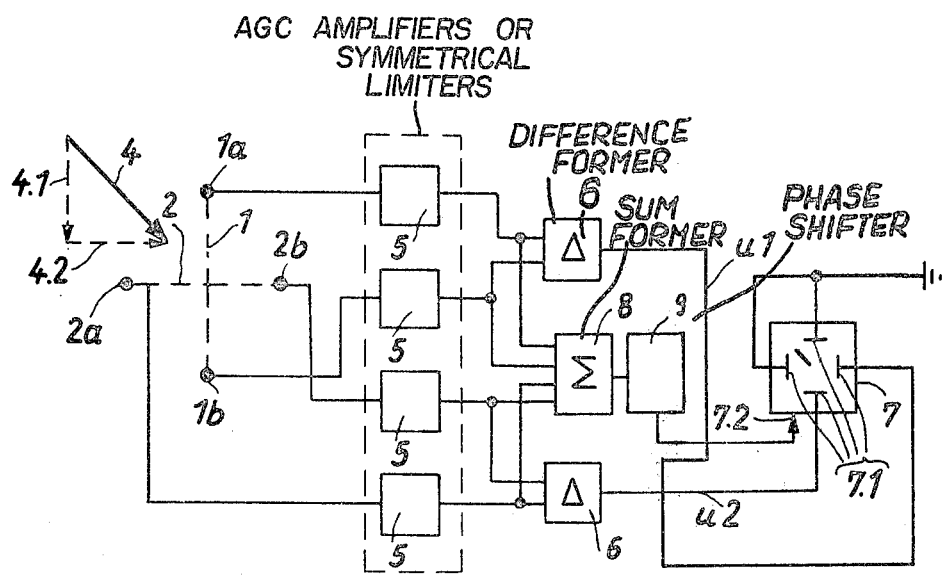
FIG. 1 is a block diagram of a system for measuring the angle of impingemennt in accordance with the present invention.

FIG. 1 is a block diagram of the circuit arrangement according to the present invention for evaluating received signals from a gradient ranging system. The gradient ranging system includes two pairs of dipoles which are arranged in a common plane with their axes 1 and 2 perpendicular to one another. Each pair of dipoles includes two individual receivers 1a, 1b, or 2a, 2b, respectively. An energy wave is received from a direction of impingement, for example direction 4, in the plane of the gradient ranging system. The four individual receivers 1a, 1b, 2a, 2b are each connected to a respective amplifier circuit 5 in order to produce constant amplitude representation of the received signals. When quasi-stationary signals are evaluated the amplifier circuits 5 are automatic gain control amplifiers which process the signal so as to obtain a constant amplitude for the alternating signal at their output. The outputs of the two amplifier circuits 5 associated with individual receivers 1a, 1b are connected together with a difference former 6 to produce the difference voltages u1 and the other two amplifier circuits 5 associated with receivers 2a, 2b are connected together with another difference former 6 to produce difference voltage u2. The voltages u1 and u2 constitute a measure for components 4.1 and 4.2 of the direction of impingement 4 of the received energy wave projected on the axes 1 and 2 of the pairs of dipoles.

The difference voltages u1 and u2 are fed to the deflection system 7.1 of the cathode-ray tube 7. A sum former 8 sums all of the received signals after they have been processed by amplifiers 5. The output of sum former 8 is fed to a 90° phase shifting circuit 9 the output of which is connected to a brightness control device 7.2 of the cathode-ray tube 7. These inputs to the cathode-ray tube lead to the display of a luminous streak which represents the direction of impingement 4 of the energy wave.

Since the received signals of the individual receivers 1a, 1b, 2a, 2b of the gradient ranging system are fed to amplifier circuits 5 to produce constant amplitudes before further processing is effected for a suitable display of the direction of impingement 4, the need for bloom controlling of a bearing indicating device is eliminated even if the received signals cover a wide dynamic range. Additionally, the processing of the received signals according to the present invention completely eliminates errors due to variations in the amplitude of the signals from the individual receivers 1a, 1b, 2a, 2b, which always occur even with the most careful manufacturing conditions. Only the phase information of the received signals is evaluated for controlling the display of the direction of impingement 4. FIGS. 1a, 1b, 1c, and 1d show signals received at the output of each of the amplifier circuits 5, which are automatic gain control amplifiers. For this case the output signal of the sum former 8 is illustrated in FIG. 1e. This directional independent received signal after it has been phase shifted, as shown in FIG. 1f, actuates the brightness control device 7.2 by its positive values. The difference voltages u1 and u2 are shown in FIG. 1g and FIG. 1h. During the period of operation of the brightness control device 7.2, the difference voltages u1 and u2, in the present example run from a zero value via negative values to back a zero value, so that the electron beam is deflected from the middle of the screen toward the left upper corner. On the screen of the cathode-ray-tube 7 (FIG. 1) there is thus produced a stroke showing the direction of impingement 4. If a different threshold value is utilized for actuating the brightness control device 7.2 it is possible to produce only a dot on the screen.

Figure 2:
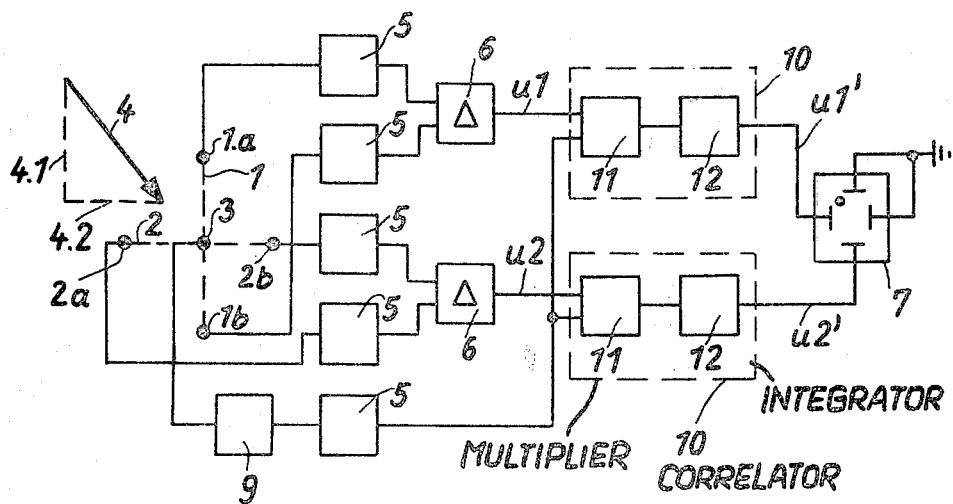
FIG. 2 is a block diagram of another system, in accordance with the present invention, for measuring of the angle of impingement utilizing correlative processing of the received signals.

FIG. 2 shows a gradient ranging system utilizing two perpendicularly arranged pairs of dipoles formed by receivers 1a, 1b and 2a, 2b, respectively, and a panoramic or omnidirectional receiver 3. The received signal of the panoramic receiver 3 is independent of the direction. The signal from receiver 3 is processed by an additional amplifier circuit 5 via a phase shifting circuit 9. The directionally independent received signal leaving amplifier circuit 5 corresponds to the 90° phase shifted output signal of the sum former 8 in the block diagram of the circuit according to FIG. 1, i.e. the panoramic receiver 3 with its subsequently connected amplifier circuit 5 and the sum former 8 with the amplifier circuits 5 connected ahead of the sum former 8 can be alternatingly exchanged with one another. The amplifier circuits 5 in this case may be either automatic gain control amplifiers or symmetrical limiters.

The display of the direction of impingement 4 can also be optimized by correlating the difference voltages u1, u2, according to FIG. 1, with the signal from receiver 3 which has a constant amplitude after processing by its respective amplifier 5 and is independent of the direction of impingement. For this purpose the directionally independent received signal is fed via a 90° phase shifting circuit 9 and amplifier 5 to each of the correlators 10 together with a respective one of the difference voltages u1 or u2. The correlators 10 each include a multiplier 11 in series with an integrator 12.

Correlated difference voltages u1' and u2', from the two correlators 10, are then fed to a known bearing display device, for example the above-mentioned cathode-ray tube 7 as the quotient former.

It is also possible within the scope of the present invention to first infinitely clip the received signals from the individual receivers 1a, 1b, 2a, 2b and from the panoramic receivers 3 and then, before the formation of the differences, correlate them as shown in FIG. 3. The individual receivers 1a, 1b, 2a, 2b are again connected with the amplifier circuits 5 to produce constant amplitudes. The panoramic receiver 3 is also similarly connected with a further amplifier circuit 5 via the 90° phase shifting circuit 9. The signal from each of the respective individual receivers 1a, 1b, 2a, 2b which has a constant amplitude is correlated in correlator 10 with the nondirectional, constant amplitude received signal from the panoramic receiver 3. Accordingly, four correlators 10 are provided.

The multipliers 11 utilized here can be simply a polarity coincidence circuit, which for clipped received signals could be formed by a identity gate.

Four correlation voltages appear at the outputs of the individual correlators 10. The correlation voltages from each pair of dipoles are subtracted from one another in a difference former 6 and then are fed to the bearing indicator device as correlated difference voltages u1' and u2'.

The above embodiments are designed for use for gradient evaluation. The present invention can be used with just as much advantage for a phase evaluation of constant amplitude received signals from each pair of dipoles as shown in FIGS. 4 and 5.

FIG. 4 shows an embodiment for two pairs of dipoles each having two individual receivers 1a, 1b, 2a, 2b each connected to an amplifier circuit 5. Two phase difference measuring circuits or discriminators 13, each of which is connected to the amplifier circuits 5 associated with a respective pair of dipoles, are provided. The phase circuits 13 furnish two output voltages u1'' and u2'' each of which constitutes a measure of the phase shift of the received signals from one pair of dipoles and thus a measure of the components 4.1, 4.2 of the direction of impingement 4.

It is also possible to construct a ranging system in which the two pairs of dipoles which are aligned perpendicular to one another are formed by only three individual receivers. The three individual receivers are arranged at the end points or vertices of a right angled, isosceles triangle. That individual receiver which is disposed at the vertex of the right angle forms a pair of dipoles with each one of the other two individual receivers.

FIG. 5 shows such a ranging system including the individual receivers 2a, 1b and the individual receiver at the vertex of the right angle which is simultaneously the panoramic receiver 3. The received signals from the two individual receivers 2a, 1b and the panoramic receiver 3 are fed to their respective amplifier circuits 5. The output of the amplifier circuit 5 of the panoramic receiver 3 and each of the outputs of the other two amplifier circuits 5 are connected to a respective one of two phase difference measuring circuits 13 whose output voltages u1'' and u2'' then are fed to a bearing display device in the same manner as in the preceding figures.

The ranging system utilizing only a total of three individual receivers is also suited for gradient evaluation.

When amplifier circuits 5 are employed to infinitely clip the received signals and to subsequently evaluate the gradients of the received signals in accordance with any of the above circuitry, the resulting systematic ranging error originating from the spatial harmonics of the angle of impingement is substantially smaller than the error occurring in the evaluation of unclipped received signals. This decrease in the error is obtained since the clipping of the signals permits the evaluation of two correlated difference voltages, which are directly proportional to the sine or cosine, respectively, of the angle of impingement. In contrast, the evaluation of unclipped received signals of a gradient ranging system leads to an additional trigonometric dependency of the sine or cosine, respectively, of the angle of impingement which can be mathematically developed in a known manner in a series. The series development would indicate the error due to higher harmonics of the angle of impingement. The operation of the processing of the clipped received signals will be shown in FIG. 6 with the aid of the time sequences for the received signals from an individual receiver 2a and a panoramic receiver 3 according to the circuitry of FIG. 3.

FIG. 6a shows a path E of an infinitely clipped received signal from an individual receiver 2a and FIG. 6b shows the path R of an infinitely clipped received signal from a panoramic receiver 3. The abscissa in FIG. 6 are always the product of time $t$ and circuit frequency $\omega$ of the received signals so that positions on the abscissa are equal to the phase angles $\beta$. The two curves E and R have a phase angle of $\beta 1$ with respect to one another. In accordance with the correlative processing of the circuitry in FIG. 3, the received signal from the panoramic receiver 3 is now shifted in phase by $\pi/2$ (curve $j \cdot R$ in FIG. 6c) and is compared with the infinitely clipped received signal E from individual receiver 2a of FIG. 6a in a polarity coincidence circuit such as the multiplier 11. The output signal curve A of the multiplier 11 is shown in FIG. 6d. This output signal curve A has alternatingly positive and negative values with a period of $\omega t = \pi$. For $\omega t = \pi/2 - \beta 1$ its value is positive and for $\omega t = \pi/2 + \beta 1$ its value is negative. This output signal curve A is then integrated in an integrator 12 (FIG. 3) thus producing a constant voltage value which is proportional to the phase angle $\beta 1$. The amount of this constant voltage is determined by the type of integrator used and the sensitivity of the quotient former, e.g. the above mentioned cathoderay-tube 7. If the infinitely clipped received signals from the individual receiver 2a and from the panoramic receiver 3 are considered in the same manner, it can be seen that a direct voltage is obtained which is proportional to the phase angle β1 between the two received signals of the individual receiver 2a and the panoramic receiver 3. These two direct voltages are subtracted in the difference former 6 and fed to the deflection system of the cathode-ray tube 7. The phase angle β1 is proportional to the sine or cosine, respectively, of the angle of impingement which acts as one of the vertical components 4.1 or 4.2, respectively, to effect the display of the direction of impingement 4 in the bearing display device.

These considerations apply only for the case where the following conditions are met: the distance between the individual receivers 1a, 1b or 2a, 2b, respectively of a pair of dipoles is less than one wavelength of the received signals or the distance of an individual receiver 1a from the panoramic receiver 3, even when only three individual receivers are used, is less than one-half the wavelength of the received signals, and where the useful component of the received signals is much greater than the present noise component originating from isotropic noise or from uncorrelated noise in the measuring device.

If the useful component of the received signals is not much greater than the noise component, i.e. if the signal to noise ratio is not very high, then the direct voltage at the output of the integrator is not directly proportional to the phase angle but rather to an angle which is influenced by the signal to noise ratio. FIG. 7 is a diagram illustrating the dependency of the ranging error on the signal to noise ratio first for an evaluation of unclipped received signals and second for an evaluation of clipped received signals. The angle of impingement, under consideration here, for the received wave energy is 22.5° since for such a bearing angle the errors become particularly high. The course of the systematic ranging error over the signal to noise ratio is plotted for correlative processing of clipped as well as unclipped received signals with different received frequencies as the parameters. As can be seen in the diagram, the systematic ranging error is substantial in the processing of unclipped received signals for all signal to noise ratios while during the processing of clipped received signals the ranging error decreases and becomes negligibly small when the signal to noise ratio approaches and goes above the 20 db level.

In the case of unclipped processing, the systematic ranging error is substantially greater for higher frequencies than for low frequencies. In the clipped processing according to the present invention the systematic ranging error at a signal to noise ratio of more than 20 db is always negligibly small independent of the level of the received frequencies. As signal to noise ratio decreases the systematic ranging error for the clipped received signals approaches the level of the systematic ranging error typical for the known processing of unclipped received signals. At a signal to noise ratio of −10 db the systematic ranging error for both systems becomes comparable. Since at lower signal to noise ratios statistical errors will occur, so that the systematic ranging error in this range no longer has the same significance that it has at a greater signal to noise ratio. This diagram clearly shows the advantages that can be obtained with processing of the received energy wave by the circuit arrangement of the present invention as compared to the known circuit arrangement, particularly when the received signals are infinitely clipped by the amplifier circuits 5.

The above comments with respect to the diagram of FIG. 7 can be deduced from a mathematical consideration of the physical connection upon the reception of wave energy by means of the known gradient ranging system. One of the two correlated difference voltages $u1'$ of the clipped received signals exhibits the following dependency:

$$u_1' = \arcsin\left[\frac{\text{useful energy}}{\text{signal and noise energy useful}} \sin(a \sin \delta)\right]$$

where a is a proportionality factor based on the dimensions of the gradient ranging system and the received frequency;

δ is the angle of impingement; and, $a \sin \delta = \beta\ 1$, the phase angle. The fraction in the equation almost equals "1" for a good signal to noise ratio so that the following then applies:
$u1' \sim a \sin \delta$.

Correspondingly the other correlated difference voltage $u2'$ results in the following:
$u2' \sim a \cos \delta$.

Only with an unfavorable signal to noise ratio does the fraction have a significant influence on the correlated difference voltages $u1'$, $u2'$. In the bearing display device the quotient of these two correlated difference voltages $u1'$, $u2'$ is formed so that an angle is set between the direction of impingement 4 and the reference direction which angle is identical with the angle of impingement δ.

It, therefore, is clear that the present invention has solved a serious problem which previously existed in the use of the gradient ranging art, i.e. the problem of the systematic ranging error due to linking of different trigonometric functions which, as can be proven by a mathematical series development, will normally lead to erroneous bearing indications due to higher spatial harmonics of the angle of impingement.

It will be understood that the above description of the present invention is susceptible to various modifications, changes and adaptations, and the same are intended to be comprehended within the meaning and range of equivalents of the appended claims.

We claim:

1. In a system for the determination of the direction of impingement of a received energy signal including receiver means composed of a plurality of receivers constituting pairs of mutually perpendicular dipoles for receiving orthogonal components of the impinging signal, means connected to the receivers for measuring the unfiltered received components of signals for producing output signals indicative of the direction of impingement of the received signal, and means connected to the measuring means for displaying the direction of impingement of the received signal, the improvement wherein the measuring means comprises a plurality of amplifier circuits each of which includes an automatic gain control amplifier and is connected to a respective receiver for producing a constant amplitude representation of its received signal.

2. In a system for the determination of the direction of impingement of a received energy signal including receiver means composed of a plurality of receivers constituting pairs of mutually perpendicular dipoles for receiving orthogonal components of the impinging signal, means connected to the receivers for measuring the unfiltered received components of signals for producing output signals indicative of the direction of impingement of the received signal, and display means connected to the measuring means, and including first and second deflection means, for displaying the direction of impingement of the received signal; the improvement wherein said measuring means comprises: a plurality of amplifier circuits each of which is connected to a respective receiver for producing a constant amplitude representation of its received signal; first and second difference forming means, each having input terminals and an output terminal; means for coupling said input terminals of each of said difference forming means to said amplifier circuits of a respective one of said pairs of dipoles; and means for coupling said output terminals of said first and second difference forming means to said first and second deflection means respectively.

3. A system as defined in claim 2, wherein the amplifier circuits include automatic gain control amplifiers.

4. A system as defined in claim 2, wherein the amplifier circuits include symmetrical limiters.

5. A system as defined in claim 2, wherein each of said first and second difference forming means includes means for subtracting the output signals produced by said amplifier circuits.

6. A system as defined in claim 5, wherein said measuring means further comprises: means for producing a constant amplitude omnidirectional signal which includes all of the components of the received energy signal and is independent of the direction of the received signal, and which is shifted in phase by 90° with respect to the received signal; and wherein the output of said means for producing an omnidirectional signal is coupled to a brightness control of said display means.

7. A system as defined in claim 6, wherein said means for producing a constant amplitude omnidirectional signal includes a sum forming means for summing the outputs of said amplifier circuits, and a 90° phase shifter connected to the output of said sum forming means.

8. A system as defined in claim 5, wherein said measuring means further comprises: means for producing a constant amplitude omnidirectional signal which includes all of the components of the received energy signal and is independent of the direction of the received signal, and which is shifted in phase by 90° with respect to the received signal, wherein said means for coupling said output terminal of said difference forming means to said deflection means includes a pair of correlators, each of which has a first and second input and an output, said first input of each of said correlators being coupling to the output of said means for producing the omnidirectional signal, said second input of each of said correlators being connected to the output terminal of a respective one of said difference forming means; and wherein said output of each of said correlators is connected to a respective one of said deflection means.

9. A system as defined in claim 8, wherein said means for producing an omnidirectional signal includes an additional receiver for generating an omnidirectional signal which is independent of the direction of impingement of the received signal, an additional amplifier circuit for producing a constant amplitude representation of the omnidirectional signal and a 90° phase shifter, all connected in series.

10. A system as defined in claim 2, wherein said measuring means further comprises means for producing a constant amplitude omnidirectional signal which includes all of the components of the received energy signal and is independent of the direction of the received signal, and which is shifted in phase by 90° with respect to the received signal; wherein each of said first and second difference forming means comprises means for subtracting the signals supplied to its input terminals; and wherein said means for coupling said input terminals of said difference forming means to said amplifier circuits includes a plurality of correlators, each having a first and second input and an output, said first input of each of said correlators being connected to the output of said means for producing the omnidirectional signal and said second input of each of said correlators being connected to the output of a respective one of said amplifier circuits, and said input terminals of said difference forming means being connected to said outputs of said correlators of a respective pair of dipoles.

11. A system as defined in claim 10, wherein said means for producing an omnidirectional signal includes an additional receiver for generating an omnidirectional signal which is independent of the direction of impingement of the received signal, an additional amplifier circuit for producing a constant amplitude representation of the omnidirectional signal and a 90° phase shifter, all connected in series.

12. A system as defined in claim 2, wherein each of said difference forming means comprises a phase discriminator having its inputs connected to the outputs of said amplifier circuits of a respective pair of dipoles and having an output connected to a respective one of said deflection means.

13. A system as defined in claim 2, wherein there are three receivers which are located at the vertices of a right triangle, one of said receivers being an omnidirectional receiver for generating a signal which is independent of the direction of impingement of the received energy signal and being located at the vertex of a right angle of said right triangle, and said omnidirectional receiver forming a pair of dipoles with each of said other receivers.

14. A system as defined in claim 13, wherein each of said difference forming means includes a phase discriminator having its inputs connected to the output of said amplifier of said omnidirectional receiver and one of the outputs of said amplifiers of said other two receivers and having an output connected to a respective one of said deflection means.

* * * * *